United States Patent
Woodward et al.

(10) Patent No.: US 9,678,687 B2
(45) Date of Patent: Jun. 13, 2017

(54) USER MODE HEAP SWAPPING

(71) Applicant: McAfee, Inc., Santa Clara, CA (US)

(72) Inventors: Carl D. Woodward, Santa Clara, CA (US); Venkata Ramanan Sambandam, Sunnyvale, CA (US); Dmitri Rubakha, Santa Clara, CA (US)

(73) Assignee: McAfee, Inc., Santa Clara, CA (US)

( * ) Notice: Subject to any disclaimer, the term of this patent is extended or adjusted under 35 U.S.C. 154(b) by 68 days.

(21) Appl. No.: 14/866,295

(22) Filed: Sep. 25, 2015

(65) Prior Publication Data

US 2017/0090821 A1    Mar. 30, 2017

(51) Int. Cl.
| | |
|---|---|
| G06F 3/06 | (2006.01) |
| G06F 12/14 | (2006.01) |
| H04L 9/32 | (2006.01) |

(52) U.S. Cl.
CPC ............ *G06F 3/0659* (2013.01); *G06F 3/064* (2013.01); *G06F 3/0623* (2013.01); *G06F 3/0631* (2013.01); *G06F 3/0647* (2013.01); *G06F 3/0656* (2013.01); *G06F 3/0673* (2013.01); *G06F 12/1408* (2013.01); *H04L 9/3234* (2013.01); *G06F 2212/1052* (2013.01)

(58) Field of Classification Search
CPC .... G06F 3/0659; G06F 3/0623; G06F 3/0631; G06F 3/064; G06F 3/0656
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,460,050 B1 | 10/2002 | Pace et al. |
| 6,473,842 B1 | 10/2002 | Tsutsumi |
| 7,506,155 B1 | 3/2009 | Stewart et al. |
| 8,725,963 B1 | 5/2014 | Emelianov et al. |
| 2008/0077994 A1* | 3/2008 | Comlekoglu ........... G06F 21/53 726/27 |
| 2015/0089502 A1 | 3/2015 | Horovitz et al. |
| 2015/0186659 A1* | 7/2015 | Leslie-Hurd ........ G06F 12/0875 726/1 |
| 2015/0186680 A1 | 7/2015 | Johnson et al. |
| 2015/0242231 A1* | 8/2015 | Chen ................... G06F 9/45558 711/162 |

FOREIGN PATENT DOCUMENTS

WO    2017052946    3/2017

OTHER PUBLICATIONS

International Search Report and Written Opinion issued in PCT Application No. PCT/US2016/048512 on Dec. 5, 2016; 8 pages.

* cited by examiner

*Primary Examiner* — Ryan Bertram
(74) *Attorney, Agent, or Firm* — Patent Capital Group (57) ABSTRACT

In an example, there is disclosed a computing apparatus, including a processor, including a trusted execution instruction set; a memory having an enclave portion, wherein the enclave is accessible only via the trusted execution instruction set; a swap file; and a memory management engine operable to: allocate a buffer within the enclave; receive a scope directive to indicate that the buffer is in scope; and protect the buffer from swapping to the swap file while the buffer is in scope. There is further disclosed an method of providing a memory management engine, and one or more computer-readable storage mediums having stored thereon executable instructions for providing the memory management engine.

25 Claims, 8 Drawing Sheets

USER MODE HEAP SWAPPING

FIELD OF THE SPECIFICATION

This disclosure relates in general to the field of computer security, and more particularly, though not exclusively to, a system and method for user mode heap swapping.

BACKGROUND

Computers may use "virtual memory" to extend the usable memory in a system. In virtual memory architectures, a virtual memory manager (VMM) maps virtual memory addresses to physical addresses, which are assigned according to algorithms. Virtual memory may seamlessly manage moving memory between local or cache memory, main memory (RAM), and swap files or partitions on a hard disk, by way of nonlimiting example. In an example VMM implementation, "user mode" programs need not be aware of the VMM's activities. Rather, the user mode program simply accesses the virtual memory address, and the VMM handles fetching data from or writing data to the correct location.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

In an example, there is disclosed a computing apparatus, including a processor, including a trusted execution instruction set; a memory having an enclave portion, wherein the enclave is accessible only via the trusted execution instruction set; a swap file; and a memory management engine operable to: allocate a buffer within the enclave; receive a scope directive to indicate that the buffer is in scope; and protect the buffer from swapping to the swap file while the buffer is in scope. There is further disclosed an method of providing a memory management engine, and one or more computer-readable storage mediums having stored thereon executable instructions for providing the memory management engine

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

To extend the available memory on a computing device, a VMM may "swap" out-of-scope memory buffers to a special swap file or partition on a hard disk. The term "swap file" is used throughout this specification to refer to any swap area, whether provided in a file, partition, or any other memory or storage area.

This allows the memory to be stored and available, but to not consume main memory when it is not needed. Once the memory buffer comes back into scope, it may be returned to main memory. Note that memory "buffers" are used throughout this specification by way of example, and a buffer should be understood to refer to any suitable type of memory allocation or unit.

While swapping is a useful feature, it presents some specific challenges with respect to trusted computing. In a trusted computing architecture, a trusted computing base (TCB) may be defined as trusted software that is signed and verified and can thus be treated as safe. Programs within the TCB may have extra privileges, such as executing within a memory enclave, which is a special segment of memory that can only be accessed via special trusted execution environment (TEE) instructions. As a general principle, it is advantageous to keep the TCB small to reduce the probability that an unsafe program will pass the verification process and be able to do harm. In particular, it is often considered best practice (though not an absolute requirement) to not include the operating system within the TCB. Furthermore, in the case of closed-source operating systems like Microsoft Windows and Apple iOS, it may be difficult to drive changes that would implement secure operating system-based swapping.

When the operating system is not included within the TCB, the operating system VMM cannot be used to perform swapping for memory allocated within a memory enclave. Thus, it is recognized in the specification, that there are benefits to providing VMM-like functions within the TEE itself so that the TEE can realize the advantages of swapping.

In one example, a trusted execution framework (TEF) is provided within a memory enclave. The TEF includes its own TEE or enclave VMM, which in an example may be a relatively lightweight VMM that performs relatively limited functions as compared to the full-scale VMM provided by the operating system kernel. Note however that this is not a requirement. In some cases, the functionality or even code of the operating system kernel VMM may be fully implemented within the memory enclave. Thus, within the TEE, a VMM may monitor memory allocation for TEE processes. In one example, the TEF provides an application programming interface (API)

A user space program running within the TEE may require memory allocation. This program may use specially-defined TEE wrappers, methods, or classes (called a "wrapper" herein for simplicity) to request allocation of a new buffer within the memory, along with a pointer to that buffer. Thereafter, the application may use the wrapper to access and manipulate the memory buffer. Finally, when the application is done, it may use the wrapper to free the memory. Advantageously, this provides a seamless way for application programmers to allocate, use, and free memory without concerning themselves with the specific mechanics, similar to memory allocation and use in a traditional programming environment.

"Under the hood," the enclave VMM (implemented, for example, by a TEF) may perform memory swapping as necessary. In one example, when the enclave VMM allocates a pointer for a user-space TEE program, it also allocates a "scope" object for that pointer. The scope object may indicate whether the object is currently "in scope." When the object is in scope, the enclave VMM may protect the buffer from swapping to disk. But when the object is out of scope, the buffer may be available for swapping to disk. In an example, a user mode process may explicitly manipulate the scope object when it knows it is about to request a certain memory buffer. This can reduce the overhead of swapping by warning the enclave VMM that a buffer will be needed soon. In some cases, a programmer may also insert explicit scope calls within source code to manually manage scope.

When a user-space TEE program calls the wrapper to access a previously allocated memory buffer, the enclave VMM may check whether the memory has been swapped to disk. If it has, then before returning a success signal to the memory access procedure, the enclave VMM may load the data back into main memory from disk. Conversely, if a program is not actively using a memory segment, then the enclave VMM may identify it as out of scope, and may swap those data to disk.

Advantageously, this method expands the memory available for a VMM beyond the traditional allocation. This method also keeps the TCB small, by not including the full OS kernel VMM in the TCB. When the enclave VMM is provided within a framework, the framework may provide wrappers and other useful methods to insulate application programmers from the need to perform application-specific swapping. It should be noted, however, that an end-user program could also provide its own swapping without departing from the spirit and scope of this specification.

In one example, a new class is defined called "Enclave-Buffer" as part of the TEF. This class provides the wrapper discussed herein, and may have member methods, variables, and operators that allow an end user programmer to take advantage of user-mode heap swapping without bothering with the specific mechanics.

There is further disclosed in an example an Enclave-BufferAccessor class, which defines pointer scope, and ensures that the pointer is accessible while in scope.

Advantageously, these classes introduce only small performance impacts. For example, EnclaveBuffer requires 8 bytes for every pointer on the enclave heap, while EnclaveBufferAccessor requires 40 bytes for every pointer on the enclave stack.

In an example, the enclave VMM encrypts and evicts the least recently used trusted memory pages so as to increase the amount of usable memory in memory-constrained environments. Embodiments may use lookaside lists to optimize management of commonly allocated buffer sizes.

To prevent errors from accessing evicted and restored pages (that may be at different virtual address), and to automate eviction of old and unused pages (with minimal developer efforts), the memory referencing methods disclosed herein allow developers to reliably access allocations regardless of where they are currently located in virtual address space.

To prevent heap fragmentation caused by frequent eviction and restoration, embodiments may provide a multi-heap approach, each tuned for allocations of different sizes and purposes.

For example, instead of using raw pointers, developers may access memory buffers through a <BufferHandle>. Whenever the application uses the <BufferHandle> to access an allocation, previously evicted pages may be restored to a (potentially different) virtual address. This may guarantee that the allocation is valid and available provided the developer uses the <BufferHandle> to access the allocation.

The <Scope> object may be used for tracking when the buffer is in use. The <BufferHandle> may be associated with the appropriate <Scope> object. When the <Scope> object detects that the buffer is no longer in use (but might be used later), it marks the buffer as eligible for eviction.

In an embodiment, multiple heaps may be provided to optimize eviction and restoration of trusted memory pages of fixed and similar sizes, and prevent heap fragmentation.

By way of example:

<BufferHandle>: Enables eviction and restoration of trusted memory pages and translates between the virtual address and the physical backing for the allocation which is owned by the heap manager. Therefore, the <BufferHandle> should be used whenever the developer wishes to access the trusted memory buffers. Whenever <BufferHandle> is used to access a buffer, the heap manager updates meta data to indicate that the buffer has been recently used. In this way <BufferHandle> and the heap manager are able to track which buffers are recently used and which are eligible for eviction. The <BufferHandle> is designed to abstract the memory from the application and gives the heap manager of the enclave VMM the flexibility to restore pages to different virtual addresses based on the availability of free ranges. The <BufferHandle> contains information on where the buffer is loaded in memory within the trusted environment (when the allocation is active/restored) and where the encrypted buffer is stored outside the trusted environment (when the allocation is evicted).

<Scope>: is a mechanism that defines when the corresponding <BufferHandle> is in use. When <BufferHandle> s are created or used, they are associated with a <Scope>. This helps the heap manager to determine when <BufferHandle> s are no longer needed and can be evicted. One possible way of implementing <Scope> is as a stack object, with which <BufferHandle> s are associated with it. Since <Scope> is a stack object, the <Scope> is destroyed when it goes out of execution scope. When <Scope> is deleted, <BufferHandle> s are marked as being eligible for eviction and the heap manager can evict the pages when needed.

Heap manager: The heap manager of the enclave VMM tracks the physical resources backing the trusted memory and evicts and restores allocations when a <BufferHandle> is used or eligible for eviction. When the application uses the <BufferHandle> to access the allocation, the heap manager checks to see if the physical resources that back the allocation have been evicted. Evicted pages are restored by the heap manager, and accesses of the allocation via the <BufferHandle> are successful, even if the physical address has changed. The heap manager may evict allocations that are eligible for eviction to make space for the above restoration if required. The heap manager may encrypt pages before the eviction and decrypt pages after restoration.

Frequent eviction and restoration operations might introduce heap fragmentation. The Heap manager may thus maintain multiple heaps. For example, one heap could be divided into allocations of fixed sizes that are close to commonly allocated sizes. This heap could satisfy most commonly made allocations. Another heap could be used to satisfy allocations that are either very small or too big to fit in a page.

The final heap could be used for compatibility reasons to satisfy allocations that are not close to common allocation sizes or are very small or very large. In this way heap fragmentation may be minimized.

In some embodiments, a security agent may also be provided to detect tampering with swapped memory. In this case, when a memory buffer is swapped out, whether encrypted or unencrypted, the buffer may be signed for example with a hash or other unique or pseudo-unique token. When the buffer is loaded back into memory from the swap file, it may be hashed or otherwise checked against the signing token. If the token does not match, the security agent may presume that the memory has been tampered with, and may take a security action, such as throwing an exception, posting a notification otherwise reporting the tampering, or crashing the program.

A system and method for user-mode heap swapping will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 1:
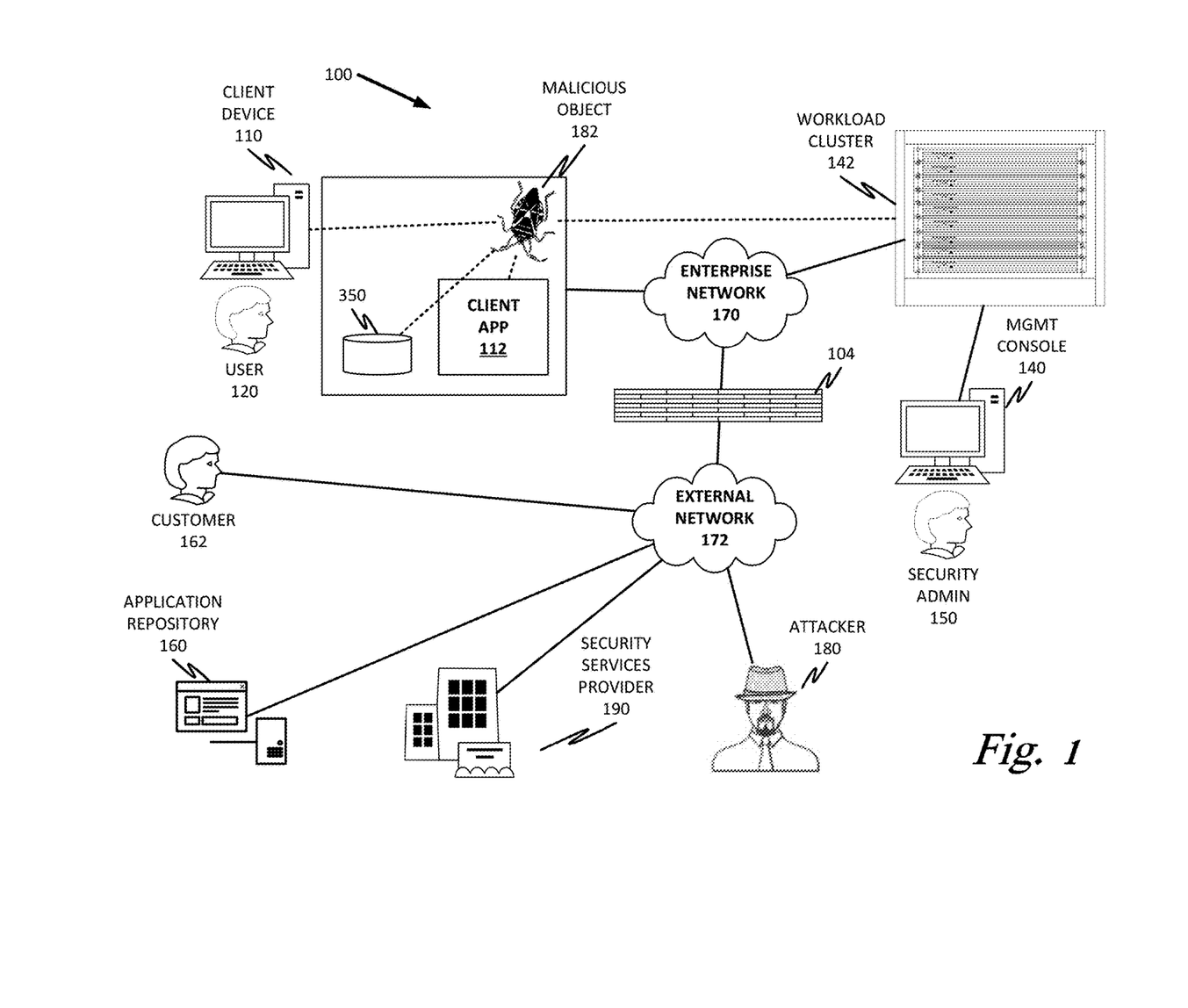
FIG. 1 is a block diagram of a security-enabled network according to one or more examples of the present specification.

FIG. 1 is a network-level diagram of a secured enterprise 100 according to one or more examples of the present specification. In the example of FIG. 1, secured enterprise 100 may be configured to provide services or data to one or more customers 162, who may access information or services via external network 172. This may require secured enterprise 100 to at least partly expose certain services and networks to the outside world, thus creating a logical security aperture.

Within secured enterprise 100, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
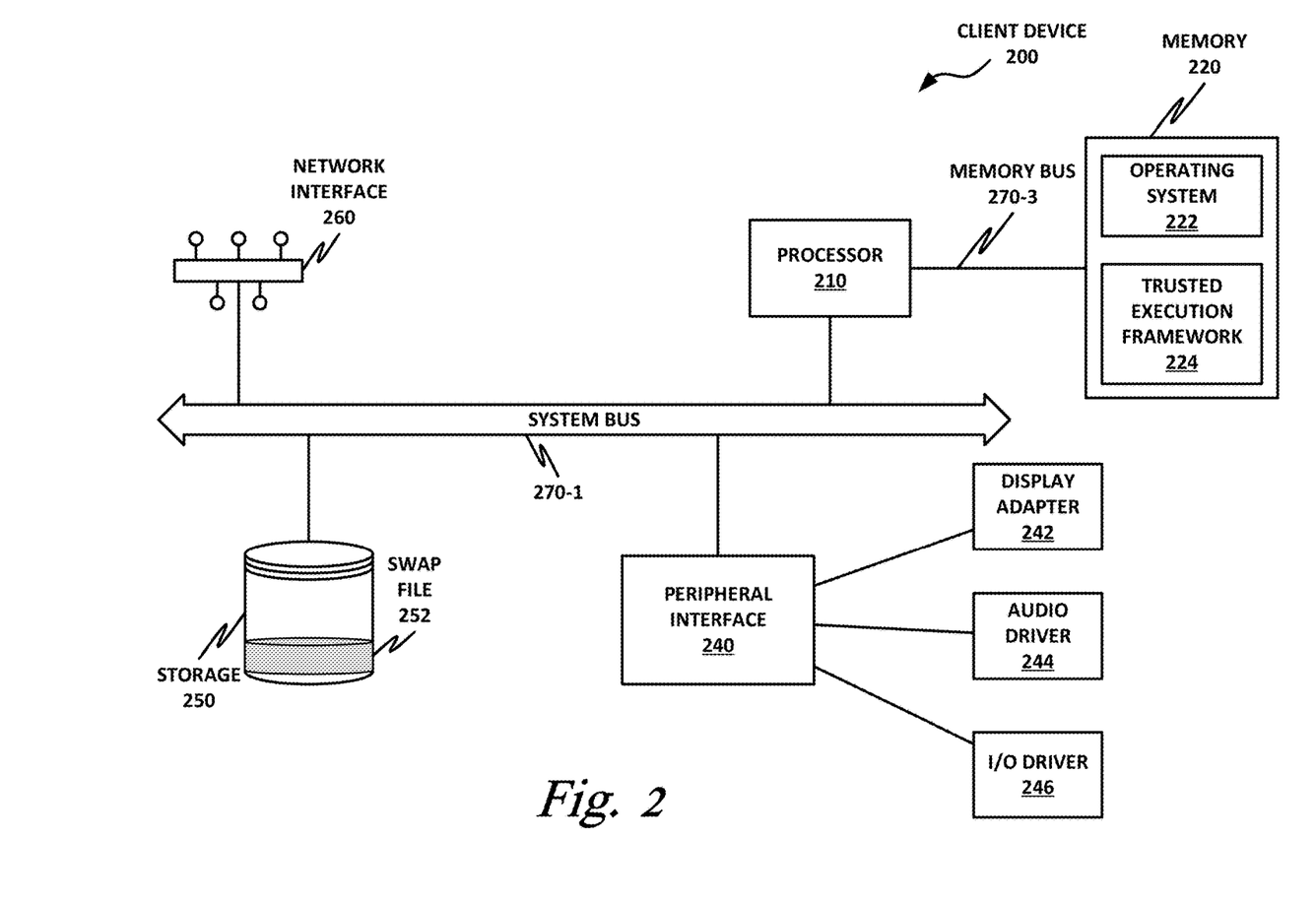
FIG. 2 is a block diagram of a computing device according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a trusted execution framework 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of trusted execution framework 224. Many other configurations are also possible, and are intended to be encompassed within the broad scope of this specification.

In one example, storage 250 contains a swap file 252, swap partition, or other swap area. In some embodiments, a plurality of swap files may also be provided. Furthermore, in one embodiment, a swap file for TEE 300 may be provided as encrypted data within memory 220, so that data can be "swapped out" of TEE 300 without swapping to a relatively slow hard disk. This may effectively allow TEE 300 to take advantage of the full available memory for computing device 200 without compromising the integrity of TEE 300.

In an example, a virtual memory manager (VMM), which may be provided by operating system 222, maps physical memory locations to virtual memory addresses. This enables applications to manage memory more easily, and may also provide increased security by providing memory protection. In some cases, it may also enable more data to be loaded into memory than is physically available. This can be provided via "paging," wherein the VMM identifies blocks of memory that are not currently in use and writes them to swap file 252, thus freeing up faster main memory.

However, as noted below, operating system 222 may not be part of the "trusted computing base" (TCB), which means that it may not be able to manage memory within TEE 300 of FIG. 3.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Trusted execution framework (TEF) 224, in one example, is operable to carry out computer-implemented methods as described in this specification. TEF 224 may include one or more tangible non-transitory computer-readable mediums having stored thereon executable instructions operable to instruct a processor to provide a trusted execution framework 224. As used throughout this specification, an "engine" includes any combination of one or more logic elements, of similar or dissimilar species, operable for and configured to perform one or more methods provided by the engine. Thus, TEF 224 may comprise one or more logic elements configured to provide methods as disclosed in this specification. In some cases, TEF 224 may include a special integrated circuit designed to carry out a method or a part thereof, and may also include software instructions operable to instruct a processor to perform the method. In some cases, TEF 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that TEF 224 may also include other hardware and software, including configuration files, registry entries, and interactive or user-mode software by way of non-limiting example.

In one example, TEF 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of TEF 224 to provide the desired method.

Conceptually, TEF 224 may provide an application programming interface (API), and supporting software, that simplifies a programmer's use of TEE 300 (FIG. 3).

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3A:
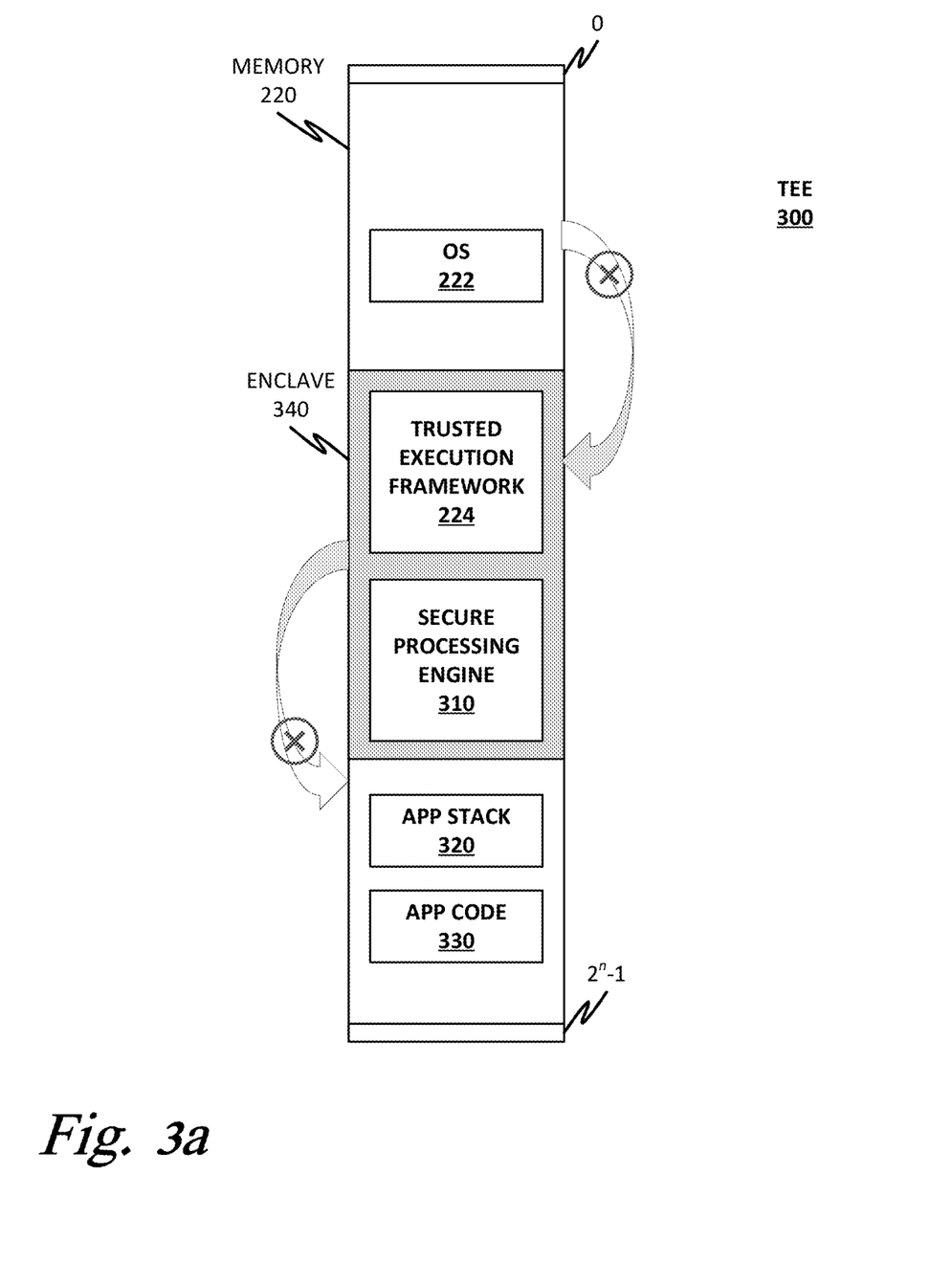
FIGS. 3a and 3b are a block diagram of a trusted execution environment (TEE) according to one or more examples of the present specification.

FIG. 3 is a block diagram of a trusted execution environment (TEE) 300 according to one or more examples of the present specification.

In the example of FIG. 3, memory 220 is addressable by n-bits, ranging in address from 0 to $2^n-1$. Within memory 220 is an OS 222, enclave 340, application stack 320, and application code 330.

In this example, enclave 340 is a specially-designated portion of memory 220 that cannot be entered into or exited from except via special instructions, such as Intel® SGX or similar. Enclave 340 is provided as an example of a secure environment which, in conjunction with a secure processing engine 310, forms a trusted execution environment (TEE) computing device 200. A TEE 300 is a combination of hardware, software, and/or memory allocation that provides the ability to securely execute instructions without interference from outside processes, in a verifiable way. By way of example, TEE 300 may include memory enclave 340 or some other protected memory area, and a secure processing engine 310, which includes hardware, software, and instructions for accessing and operating on enclave 340. Thus, it should be noted that in an example, secure processing engine 310 may be a user-mode application that operates via trusted execution framework 224 within enclave 340. TEE 300 may also conceptually include processor instructions that secure processing engine 310 and trusted execution framework 224 require to operate within enclave 340.

Secure processing engine 310 and trusted execution framework 224 may together form a trusted computing base (TCB), which is a set of programs or computational units that are trusted to be secure. Conceptually, it may be advantageous to keep TCB relatively small so that there are fewer attack vectors for malware objects 182 or for negligent software. Thus, for example, operating system 222 may be excluded from TCB, in addition to the regular application stack 320 and application code 330.

In certain systems, computing devices equipped with the Intel Software Guard Extension (SGX) or equivalent instructions (such as ARM "TrustZone") may be capable of providing an enclave 340. It should be noted however, that many other examples of TEEs are available, and TEE 300 is provided only as one example thereof. Other secure environments may include, by way of nonlimiting example, a virtual machine, sandbox, testbed, test machine, or other similar device or method for providing a TEE 300.

In an example, enclave 340 provides a protected memory area that cannot be accessed or manipulated by ordinary computer instructions. Enclave 340 is described with particular reference to an Intel® SGX enclave by way of example, but it is intended that enclave 340 encompass any secure processing area with suitable properties, regardless of whether it is called an "enclave."

One feature of an enclave is that once an enclave region 340 of memory 220 is defined, as illustrated, a program pointer cannot enter or exit enclave 340 without the use of special enclave instructions or directives, such as those provided by Intel® SGX architecture. For example, SGX processors provide the ENCLU[EENTER], ENCLU[ERESUME], and ENCLU[EEXIT]. These are the only instructions that may legitimately enter into or exit from enclave 340.

Thus, once enclave 340 is defined in memory 220, a program executing within enclave 340 may be safely verified to not operate outside of its bounds. This security feature means that secure processing engine 310 is verifiably local to enclave 340. Thus, when untrusted packet 120 provides its content to be rendered with secure processing engine 310 of enclave 340, the result of the rendering is verified as secure.

Enclave 340 may also digitally sign its output, which provides a verifiable means of ensuring that content has not been tampered with or modified since being rendered by secure processing engine 310. A digital signature provided by enclave 340 is unique to enclave 340 and is unique to the hardware of the device hosting enclave 340.

In many cases, the available memory within TEE 300 is limited with respect to main memory. For example, in SGX 1.0, TEE 300 is limited to 96 Mb on Microsoft Windows platforms. Thus, programs within the TCB may find themselves severely restricted in size and complexity, or they may find that they are required to offload significant portions of their processing into untrusted memory spaces. This may present a functional limitation on some trusted computing programs.

Thus, trusted execution framework 224 of the present specification may provide methods that overcome these limitations. In one example, TEF 224 provides for user-mode heap swapping. In this example, when TEE 300 exhausts its memory allocation, it does not rely on the VMM of OS 222 to provide swapping to disk.

Figure 3B:
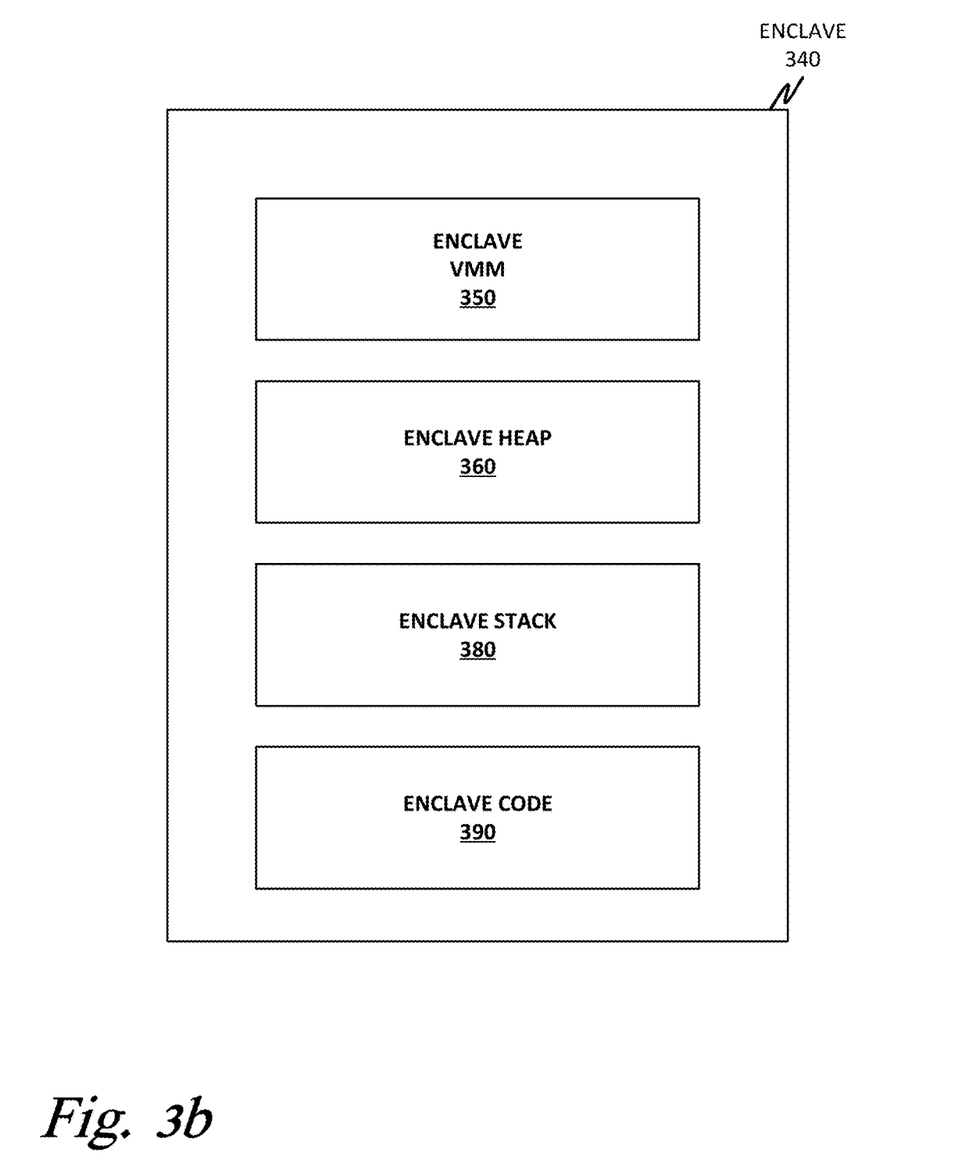

Rather, as illustrated in FIG. 3b, TEF 224 may allocate specific memory areas within enclave 340. In this example, TEF 224 provides an enclave VMM 350, an enclave heap 360, an enclave stack 380, and enclave code 390.

In this example, enclave VMM 350, enclave heap 360, enclave stack 380, and enclave code 390 may provide substantial analogs to their non-TEE counterparts in general computing. For example, enclave VMM 350 may provide a similar function to an ordinary VMM, including a page table, and swapping logic. Specifically, a page table of enclave VMM 350 may include mappings of virtual memory addresses and physical memory addresses.

Enclave heap 360 may be similar to a standard "heap" memory, providing a non-structured "free store" area where memory may be allocated as needed.

Enclave stack 380 may provide an ordinary call stack, where a calling routine may "push" arguments onto the stack, in order, before calling a subroutine, and the subroutine may "pop" arguments off of the stack, in reverse order, to use them in its processing.

Enclave code 390 may include the actual executable instructions used by the enclave-based program.

In many cases, enclave heap 360 is the largest memory allocation required to implement enclave 340. Thus, as in non-TEE computing, it is enclave heap 360 that is most likely to be swapped to disk. However, heap swapping is used as a non-limiting example, and in an abstract sense, any suitable memory location can be swapped to disk. This specification provides examples of stack swapping as well. When heap swapping is used as an example herein, it should be understood to be for purposes of illustration, and the description can be equally applied to other types of swapping.

In this example TEF 224 includes its own internal enclave VMM 350 that maintains its own page table and swaps memory out of and back into enclave heap 360 as computing demands require. Advantageously, this means that OS 222 need not be included in the TCB.

Figure 4:
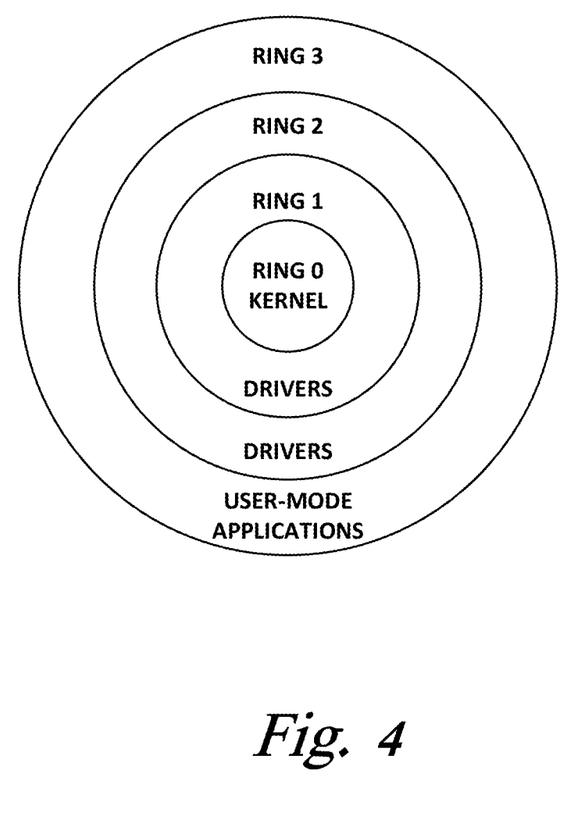
FIG. 4 is a block diagram of a protection ring architecture according to one or more examples of the present specification.

FIG. 4 is a block diagram of hierarchical protection domains ("rings" or "protection rings") according to one or more examples of the present specification. In some cases, operating system 222 may provide different levels of access to resources based on which "ring" (e.g., privilege level) a process is associated with. The rings of FIG. 4 should be understood to be a logical representation of data flow and structures, and not necessarily a physical division or structure. A "lower level" ring may be a ring that has more direct access to hardware and resources, and that may provide interfaces for "higher level" rings to access the hardware and resources in controlled ways. It should be understood that software does not physically reside within a ring, but rather that particular processes may be assigned to a specific ring, and that the process will then have at most the privileges assigned to its assigned ring.

In an embodiment, a protection ring is a hierarchical layer of privileged access to system resources. This may be hardware-enforced by some CPU architectures that provide different CPU modes at the hardware or microcode level. Rings may be arranged in a hierarchy from most privileged/trusted (ring 0) to least privileged/trusted (highest ring number, in this case ring 3). Ring 0 may interact most directly with the physical hardware such as the CPU and memory.

"Gates" may be provided, for example via an API or framework, between rings to allow a process associated with an outer ring to access a resource with privileges owned or controlled by an inner ring, but only, in a defined manner. This can prevent processes having only the privileges of a higher ring from misusing resources whose privileges are owned by a lower ring. For example, malicious object 182 (restricted to ring 3 privileges) may be prevented from directly accessing hardware resources (like a web camera, microphone, or key logger that could be turned on to spy on a user) if hardware access is limited to ring 1 or lower (thus allowing drivers to access hardware directly).

In an example, software (such as, for example, a web browser) associated with higher numbered rings may still access these resources, but only via defined requests that are directed to and managed by software associated with lower rings. This limits what, how, and when a process associated with a higher ring can do with resources, thus preventing abuse from (for example) malicious object 182

In an example Intel® CPU based on the x86, IA-64, or similar architectures, four rings may be provided, as illustrated in FIG. 4, where ring 0 is reserved for the kernel, rings 1 and 2 are reserved for drivers, and ring 3 is for user-mode applications.

The processor may keep track of the logical ring assigned to an executing instruction thread via special machine registers. The processor hardware may restrict ways in which control can be passed from one ring to another, and also enforce restrictions on the types of memory access that can be performed across rings. Using x86 as an example, there is a special gate structure referenced by the call instruction that transfers control in a secure way towards predefined entry points in a lower-level (more trusted) ring. This functions as a supervisor call in many operating systems that use the ring architecture. The hardware restrictions may limit opportunities for accidental or malicious breaches of security. In addition, the most privileged ring may be given special capabilities, (such as real memory addressing that bypasses the virtual memory hardware).

In an example, TEF 224 and enclave code 390 may be associated with and have the privileges of user mode (ring 3). Thus, if TEF 224 provides its own internal VMM, it may not have direct access privileges to system resources. However, TEF 224 may use "gates" to access resources such as memory and storage in a manner that maintains the integrity of the ring architecture, and still enables the VMM of TEF 224 to perform its memory management functions.

Figure 5:
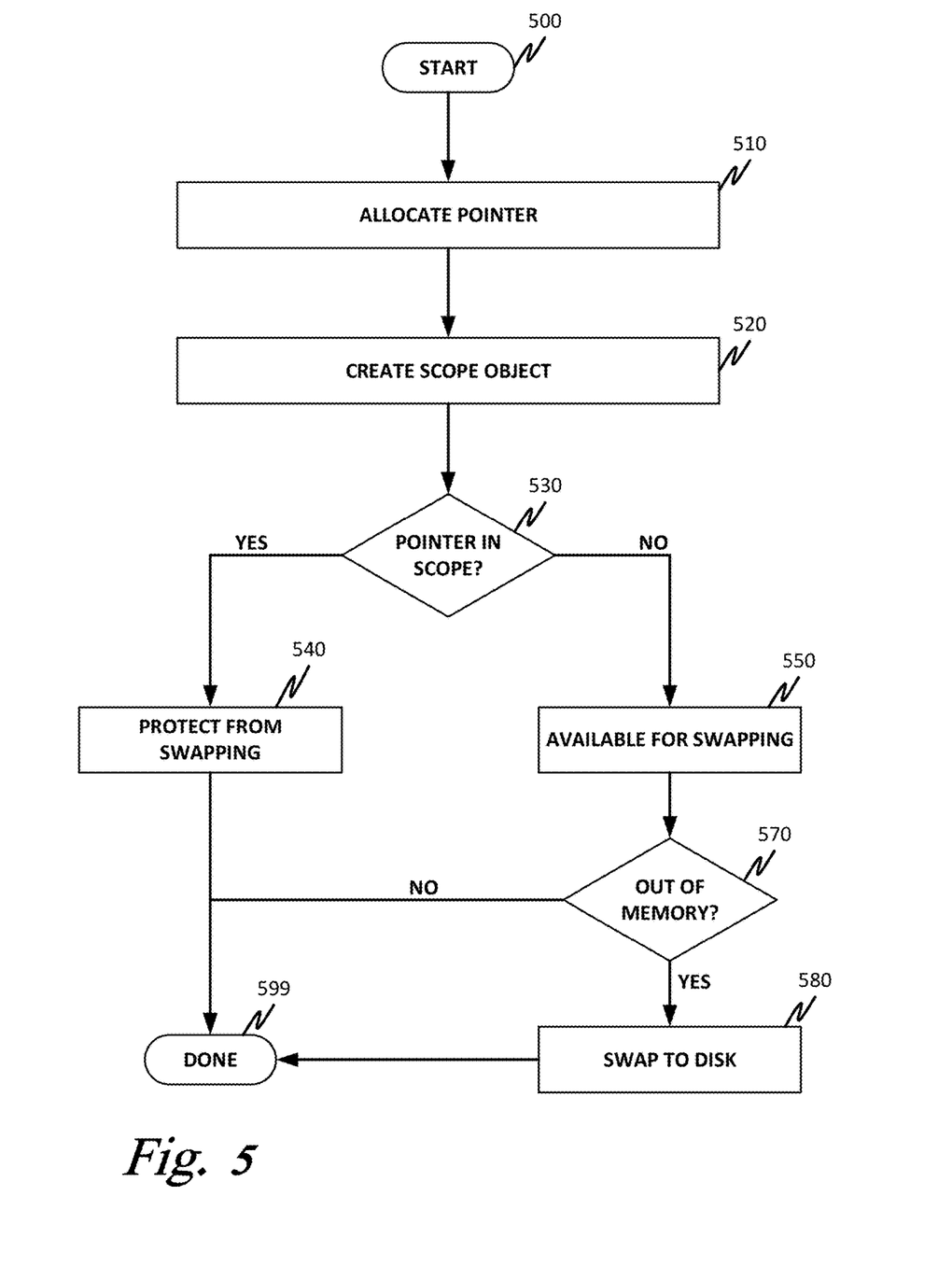
FIG. 5 is a flow chart of a method according to one or more examples of the present specification.

FIG. 5 is a flow chart of a method 500 performed in an example by TEF 224. However, it should be noted that other architectures are possible. For example, a user-mode application that is part of the TCB may itself perform the memory management functions described herein, or memory management may be performed by an external program.

The method of FIG. 5 illustrates the concept that a "scope" object may be defined to track when a memory pointer is "in scope."

Starting in block 500, in block 510, a user mode process running within TEE 300 allocates a buffer within enclave heap 360. Enclave code 390 may allocate a buffer within enclave heap 360 by calling one of the special enclave instructions or wrappers introduced herein. The wrapper may implement a method similar to the "malloc" method used in C programming, the "new" operator used in C++ or Java, or other similar methods that allocate a memory space. Enclave VMM 350 receives the instruction, and allocates a pointer to the new keep area, such as enclave keep 360.

In block 520, enclave VMM 350 may also create a scope object. The scope object is an object that may be associated with the pointer created in block 510, and indicates when the pointer, or the memory that it points to, is in scope or out of scope.

In decision block 530, enclave VMM 350 checks whether the pointer is currently in scope.

In block 540, if the pointer is in scope, then enclave VMM 350 protects the pointer from swapping, and retains it within enclave heap 360. Then in block 599, the method is done.

Returning to block 530, if the pointer is not currently in scope, then in block 550, the buffer is available for swapping.

In block 570, enclave VMM 350 checks whether enclave heap 360 is out of memory. In certain embodiments, if enclave heaps 360 is not out of memory, then there is no need to swap out the allocated memory, even though the pointer is not in scope. Thus, in block 599, the method is done.

However, in block 570 if enclave heaps 360 is out of memory, then in block 580, enclave VMM 350 swaps the memory to disk. This may comprise writing the memory buffer to a swap file or swap disk. If the buffer comes from an encrypted region, such as enclave heap 360, it may be encrypted before it is written to disk. However, it should also be noted that some user-mode programs have both "secure" portions and "non-secure" portions, meaning that a single process may use both encrypted and unencrypted memory. Thus, in some embodiments, data is encrypted before writing to disk only if it is in a "secure" portion of the process. In one example, memory is encrypted using a one-time pad and an XOR, though any suitable encryption method may be used.

In block 599, the method is done.

Figure 6:
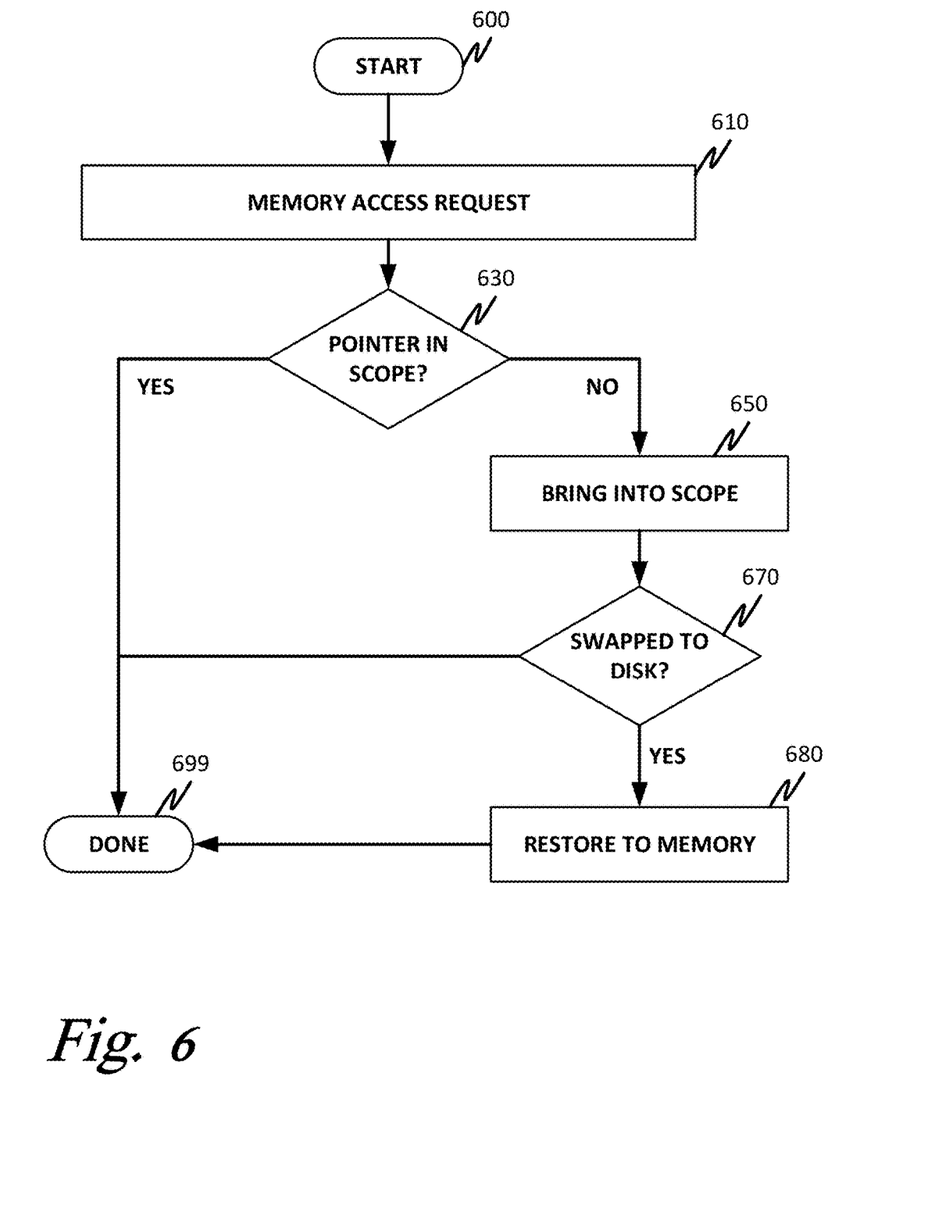
FIG. 6 is a flow chart of a method according to one or more examples of the present specification.

FIG. 6 is a block diagram of a method performed by enclave VMM 350 according to one or more examples of the present specification.

Starting in block 600, at block 610, there is a memory access request directed to a buffer that has been allocated within TEE heap 360.

In decision block 630, enclave VMM 350 checks whether the pointer is currently in scope. If the pointer is currently in scope, then it is protected from swapping, and thus is available in main memory. Thus, in block 699, the method is down.

However, if the pointer is not currently in scope, then it may or may not have been swapped. In block 650, enclave VMM 350 first brings the pointer back into scope, for example by updating the scope object.

In decision block 670, enclave VMM 350 checks whether the buffer has been swapped to disk or other swap area. If not, then no further action needs to be taken, and in block 699 the method is done.

If the buffer has been swapped to disk, then in block 680, enclave VMM 350 restores the buffer to main memory. For example, enclave VMM 350 may fetch the buffer from where it is stored in the swap file, load the buffer into main memory, and update the TEE page table to indicate the new memory position. This block may also comprise unencrypting the buffer as necessary. In block 699, the method is done.

Figure 7:
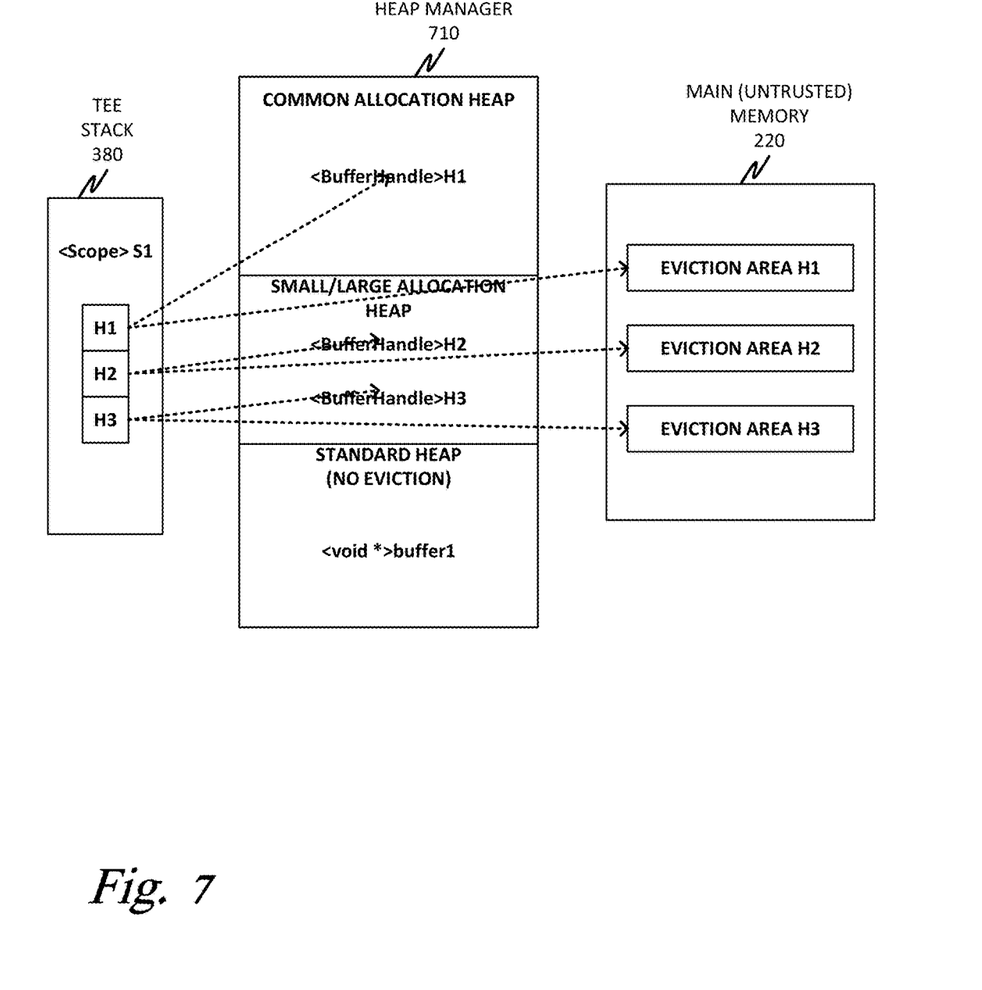
FIG. 7 is a block diagram of memory management according to one or more examples of the present specification.

FIG. 7 is a block diagram of a swapping operation according to one or more examples of the present specification.

In this case, three buffer handles are shown (<BufferHandle> H1, H2, H3), associated with the <Scope> S1. The eviction areas (eviction area H1, H2, H3) are also shown. The <void*> buffer1 illustrates backward compatibility, as this is a raw pointer that is not managed by enclave VMM 350.

From an operational perspective:

<BufferHandle> s wrap buffers, and are instantiated using special wrapper classes, rather than "raw" methods like "malloc( )" or similar.

Heap manager 710 looks at the type of allocation (size, alignment etc.) and picks an appropriate heap to satisfy the allocation.

A <Scope> is instantiated and the <BufferHandle> s are associated with it.

The data are accessed via the <BufferHandle> s instead of a raw pointer.

Heap manager 710 checks whether the trusted memory pointed to by <Buffer|Handle> s is valid.

If the allocation is restored/active, heap manager 710 updates the least recently used timestamp for the buffer and grants access to the underlying data.

If the buffer is evicted, heap manager 710 makes space for the restoration if required by picking a buffer to be evicted that is not currently in use, or is old, or out of scope. Heap manager 710 then encrypts and evicts the chosen buffer from enclave heap 360, thus freeing up space for the <BufferHandle> to be restored.

Heap manager 710 finds the encrypted data corresponding to the <BufferHandle> being restored and decrypts the allocation, restoring it within the available space that was freed previously.

Heap manager 710 updates the <BufferHandle> metadata to point to the physical address for the restored buffer, thereby granting the application access to the buffer.

When the <Scope> goes out of execution scope, heap manager 710 marks all the <BufferHandle> s associated with it as future candidates for eviction. Note that <BufferHandle> s may be allocated and freed explicitly by the developer, and thus may not be released automatically. The application may then use the <BufferHandle> s later with a new <Scope>. In other embodiments, automatic garbage collection may be provided by TEF 224, in which case out-of-scope <BufferHandle> s may be automatically freed.

If the application uses the same <BufferHandle> later, heap manager 710 may restore the allocation if it was evicted earlier.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE IMPLEMENTATIONS

There is disclosed in one example, a computing apparatus, comprising: a processor, including a trusted execution instruction set; a memory having an enclave portion, wherein the enclave is accessible only via the trusted execution instruction set; a swap file; and one or more logic elements comprising a memory management engine operable to: allocate a buffer within the enclave; receive a scope directive to indicate that the buffer is in scope; and protect the buffer from swapping to the swap file while the buffer is in scope.

There is further disclosed an example, wherein the memory management engine is operable to detect that the buffer is out of scope, and to enable swapping of the buffer to the swap file.

There is further disclosed an example, wherein the memory management engine is operable to swap the buffer to the swap file.

There is further disclosed an example, wherein swapping the buffer to the swap file comprises encrypting the buffer.

There is further disclosed an example, wherein the memory management engine is operable to: determine that the buffer has been swapped to the swap file; and retrieve the buffer from the swap file.

There is further disclosed an example, wherein retrieving the buffer from the swap file comprises decrypting the buffer.

There is further disclosed an example, wherein the memory management engine comprises a framework.

There is further disclosed an example, wherein the framework is configured to encapsulate a pointer to the buffer.

There is further disclosed an example, wherein encapsulating the pointer to the buffer comprises determining that the pointer previously pointed to a first memory location, determining that after having been swapped the pointer now points to a second memory location different from the first memory location, and updating the pointer to point to the second memory location.

There is further disclosed an example, wherein the memory management engine is further operable to determine that the buffer was tampered with while swapped, and acting on the determining.

There is further disclosed an example, wherein acting on the determining comprises taking a security action.

There is further disclosed an example, wherein the security action is selected from the group consisting of crashing the application, throwing an exception, and reporting the tampering.

There is further disclosed an example, wherein the memory management engine is further operable to allocate a plurality of heaps.

There is further disclosed an example of one or more tangible, non-transitory computer-readable storage mediums having stored thereon executable instructions for instructing one or more processors for providing a memory management engine operable for performing any or all of the operations of the preceding examples.

There is further disclosed an example of a method of providing a memory management engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
    a processor to provide a trusted execution instruction set;
    a memory having an enclave portion, wherein the enclave is accessible only via the trusted execution instruction set;
    a swap file; and
    one or more logic elements comprising a memory management engine operable to:
        allocate a buffer within the enclave;
        receive a scope directive to indicate that the buffer is in scope; and
        protect the buffer from swapping to the swap file while the buffer is in scope.

2. The computing apparatus of claim 1, wherein the memory management engine is operable to detect that the buffer is out of scope, and to enable swapping of the buffer to the swap file.

3. The computing apparatus of claim 2, wherein the memory management engine is operable to swap the buffer to the swap file.

4. The computing apparatus of claim 3, wherein swapping the buffer to the swap file comprises encrypting the buffer.

5. The computing apparatus of claim 1, wherein the memory management engine is operable to:
    determine that the buffer has been swapped to the swap file; and
    retrieve the buffer from the swap file.

6. The computing apparatus of claim 5, wherein retrieving the buffer from the swap file comprises decrypting the buffer.

7. The computing apparatus of claim 1, wherein the memory management engine comprises a framework.

8. The computing apparatus of claim 7, wherein the framework is configured to encapsulate a pointer to the buffer.

9. The computing apparatus of claim 8, wherein encapsulating the pointer to the buffer comprises determining that the pointer previously pointed to a first memory location, determining that after having been swapped the pointer now points to a second memory location different from the first memory location, and updating the pointer to point to the second memory location.

10. The computing apparatus of claim 1, wherein the memory management engine is further operable to determine that the buffer was tampered with while swapped, and acting on the determining.

11. The computing apparatus of claim 10, wherein acting on the determining comprises taking a security action.

12. The computing apparatus of claim 11, wherein the security action is selected from the group consisting of crashing the application, throwing an exception, and reporting the tampering.

13. The computing apparatus of claim 1, wherein the memory management engine is further operable to allocate a plurality of heaps.

14. One or more tangible, non-transitory computer-readable storage mediums having stored thereon executable instructions for providing a memory management engine for a memory enclave accessible only via a trusted execution instruction set, the memory management engine operable to:
    allocate a buffer within the enclave;
    receive a scope directive to indicate that the buffer is in scope; and protect the buffer from swapping to a swap file while the buffer is in scope.

15. The one or more tangible, non-transitory computer-readable mediums of claim 14, wherein the memory management engine is operable to detect that the buffer is out of scope, and to enable swapping of the buffer to the swap file.

16. The one or more tangible, non-transitory computer-readable mediums of claim 15, wherein the memory management engine is operable to swap the buffer to the swap file.

17. The one or more tangible, non-transitory computer-readable mediums of claim 16, wherein swapping the buffer to the swap file comprises encrypting the buffer.

18. The one or more tangible, non-transitory computer-readable mediums of claim 15, wherein the memory management engine is operable to:
    determine that the buffer has been swapped to the swap file; and
    retrieve the buffer from the swap file.

19. The one or more tangible, non-transitory computer-readable mediums of claim 18, wherein retrieving the buffer from the swap file comprises decrypting the buffer.

20. The one or more tangible, non-transitory computer-readable mediums of claim 14, wherein the memory management engine comprises a framework.

21. The one or more tangible, non-transitory computer-readable mediums of claim 20, wherein the framework is configured to encapsulate a pointer to the buffer.

22. The one or more tangible, non-transitory computer-readable mediums of claim 21, wherein encapsulating the pointer to the buffer comprises determining that the pointer previously pointed to a first memory location, determining that after having been swapped the pointer now points to a second memory location different from the first memory location, and updating the pointer to point to the second memory location.

23. The one or more tangible, non-transitory computer-readable mediums of claim 14, wherein the memory management engine is further operable to determine that the buffer was tampered with while swapped, and taking a security action.

24. A method of providing a memory management engine for a memory enclave accessible only via a trusted execution instruction set, comprising:
    allocating a buffer within the enclave;
    receiving a scope directive to indicate that the buffer is in scope; and
    protecting the buffer from swapping to a swap file while the buffer is in scope.

25. The method of claim 24, further comprising detecting that the buffer is out of scope, and enabling swapping of the buffer to the swap file.

* * * * *